(12) United States Patent
Seo et al.

(10) Patent No.: US 8,722,158 B2
(45) Date of Patent: May 13, 2014

(54) LIQUID CRYSTAL PHOTO-ALIGNMENT AGENT AND LIQUID CRYSTAL PHOTO-ALIGNMENT FILM MANUFACTURED USING THE SAME

(75) Inventors: Hyo-Ju Seo, Uiwang-si (KR); Tae-Hyoung Kwak, Uiwang-si (KR); Dong-Seon Uh, Uiwang-si (KR); Jae-Deuk Yang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 134 days.

(21) Appl. No.: 13/151,647

(22) Filed: Jun. 2, 2011

(65) Prior Publication Data

US 2011/0230606 A1    Sep. 22, 2011

Related U.S. Application Data

(63) Continuation-in-part of application No. PCT/KR2009/003126, filed on Jun. 10, 2009.

(30) Foreign Application Priority Data

Dec. 12, 2008  (KR) .................. 10-2008-0126776
Jun. 8, 2009   (KR) .................. 10-2009-0050579

(51) Int. Cl.
| | |
|---|---|
| C09K 19/56 | (2006.01) |
| C07D 303/12 | (2006.01) |
| C08L 79/08 | (2006.01) |
| C08L 63/10 | (2006.01) |
| C08K 5/1515 | (2006.01) |

(52) U.S. Cl.
USPC ....... 428/1.2; 428/1.25; 428/1.26; 252/299.4; 549/554; 549/557; 549/561; 524/114

(58) Field of Classification Search
USPC ............... 252/299.4; 428/1.2, 1.25, 1.26; 549/554, 557, 561; 524/114
See application file for complete search history.

(56) References Cited

U.S. PATENT DOCUMENTS

| | | | |
|---|---|---|---|
| 5,218,074 A | 6/1993 | Nordmann et al. | |
| 6,303,742 B1 | 10/2001 | Okada et al. | |
| 6,307,002 B1 | 10/2001 | Okada et al. | |
| 7,074,344 B2 * | 7/2006 | Nakata et al. | 252/299.4 |
| 8,057,700 B2 * | 11/2011 | Oh et al. | 252/299.4 |
| 8,088,301 B2 * | 1/2012 | Yang et al. | 252/299.4 |
| 2003/0087045 A1 | 5/2003 | Nakata et al. | |
| 2005/0014928 A1 | 1/2005 | Chu et al. | |
| 2005/0179006 A1 | 8/2005 | Imamura et al. | |
| 2006/0280881 A1 | 12/2006 | Park | |
| 2007/0036915 A1 | 2/2007 | Kurosaki et al. | |
| 2007/0093640 A1 | 4/2007 | Kim et al. | |
| 2007/0098921 A1 | 5/2007 | Liang et al. | |
| 2007/0128378 A1 | 6/2007 | Kim et al. | |
| 2007/0154658 A1 | 7/2007 | Kang et al. | |
| 2008/0293888 A1 | 11/2008 | Bachels et al. | |
| 2009/0146105 A1 | 6/2009 | Oh et al. | |

FOREIGN PATENT DOCUMENTS

| | | | |
|---|---|---|---|
| CN | 1408817 A | | 4/2003 |
| CN | 1656413 A | | 8/2005 |
| CN | 101082741 A | | 12/2007 |
| DE | 4423044 A1 | | 1/1996 |
| EP | 0477666 A1 | | 4/1992 |
| JP | 55046719 A | * | 4/1980 |
| JP | 59-145216 | | 8/1984 |
| JP | 61-059334 | | 3/1986 |
| JP | 08-208983 | | 8/1996 |
| JP | 09-080440 | | 3/1997 |
| JP | 2005-037920 | | 2/2005 |
| JP | 2008-009419 A | | 1/2008 |
| JP | 2008-181102 A | | 8/2008 |
| KR | 10-1998-0059346 | | 10/1998 |
| KR | 100213178 B1 | | 5/1999 |
| KR | 1020000035320 A | | 6/2000 |
| KR | 1020020068695 A | | 8/2002 |
| KR | 1020040083610 A | | 10/2004 |
| KR | 1020050065051 A | | 6/2005 |
| KR | 10-2005-0106423 A | | 11/2005 |
| KR | 1020070057658 A | | 6/2007 |
| TW | 200643575 A | | 12/2006 |
| TW | 200415423 A | | 9/2008 |
| TW | 200837462 A | | 9/2008 |
| WO | 2004/070694 A2 | | 8/2004 |
| WO | 2008/135131 A1 | | 11/2008 |
| WO | 2010/067933 A1 | | 6/2010 |

OTHER PUBLICATIONS

Choi et al., "Photo-alignment of Low-molecular Mass Nematic Liquid Crystals on Photochemically Bifunctional Chalcone-epoxy Film by Irradiation of a Linearly Polarized UV Light", Bull. Korean Chem. Soc. 2002, vol. 23, No. 4 587-592.*
English translation of JP55046719, 1980.*
International Search Report and Written Opinion in counterpart International Application No. PCT/KR2008/003126 dated Nov. 10, 2009, pp. 1-10.
Taiwanese Search Report for counterpart Taiwanese Application No. 098123606 completed Sep. 25, 2012, pp. 1-2.

* cited by examiner

*Primary Examiner* — Shean C Wu
(74) *Attorney, Agent, or Firm* — Additon, Higgins, Pendleton & Ashe, P.A.

(57) ABSTRACT

Disclosed is a liquid crystal photo-alignment agent and a liquid crystal photo-alignment film manufactured using the same. The liquid crystal photo-alignment agent includes an epoxy compound represented by Chemical Formula 1, and a polymer including a polyamic acid, a polyimide, or a mixture thereof.

7 Claims, No Drawings

LIQUID CRYSTAL PHOTO-ALIGNMENT AGENT AND LIQUID CRYSTAL PHOTO-ALIGNMENT FILM MANUFACTURED USING THE SAME

CROSS-REFERENCE TO RELATED APPLICATION

This application is a continuation-in-part of International Application No. PCT/KR2009/003126, filed on Jun. 10, 2009, pending, which designates the U.S., published as WO 2010/067933, and is incorporated herein by reference in its entirety, and claims priority therefrom under 35 USC Section 120. This application also claims priority under 35 USC Section 119 to and the benefit of Korean Patent Application No. 10-2008-0126776 filed in the Korean Intellectual Property Office on Dec. 12, 2008, and Korean Patent Application No. 10-2009-0050579 filed in the Korean Intellectual Property Office on Jun. 8, 2009, the entire disclosure of each of which is also incorporated herein by reference.

FIELD OF THE INVENTION

The present invention relates to a liquid crystal photo-alignment agent and a liquid crystal photo-alignment film manufactured using the same.

BACKGROUND OF THE INVENTION

A liquid crystal display (LCD) includes a liquid crystal alignment film. The liquid crystal alignment film is primarily made of polymer materials. The liquid crystal alignment film directs the alignment of liquid crystal molecules. When the liquid crystal molecules are moved by the influence of an electric field to display an image, the liquid crystal alignment film allows the liquid crystal molecules to be oriented in a predetermined direction. Generally, it is necessary to uniformly align the liquid crystal molecules in order to provide uniform brightness and a high contrast ratio to the liquid crystal device.

The conventional method of aligning the liquid crystal includes coating a polymer membrane such as a polyimide on a substrate made of a material such as glass, and rubbing the surface of the substrate with a fiber such as nylon or polyester in a certain direction. However, the rubbing method may cause serious problems when fabricating a liquid crystal panel due to fine dust or electrostatic discharge (ESD) that may be generated while rubbing the polymer membrane with the fiber.

In order to solve the problems of the rubbing method, a photo-radiation method has recently been researched to induce anisotropy to the polymer membrane by irradiating light on the membrane so as to align the liquid crystal molecules.

Polymer membrane materials for the photo-alignment method can include polymers having photo-functional groups such as azobenzene, coumarine, chalcone, and cinnamate. Such polymers are anisotropically photo-isomerized or photo-cross-linked by being irradiated with polarized light to provide anisotropy to the surface so that the polymer can induce the liquid crystal molecules to align in a certain direction.

The material for the liquid crystal alignment film should have optical stability and thermal stability, as well as no after-image, in order for it to be useful in a substantial liquid crystal display device (LCD). However, the conventional photo-alignment materials have many problems in this respect.

Further, conventional materials used for liquid crystal photo-alignment films are mainly polymeric, that is, have a polymer main chain and a photo-functional side group that is capable of inducing the photo-anisotropy, such as azobenzene or cinnamate. When such materials for a polymeric liquid crystal photo-alignment film are used, the materials may require a lot of photo-energy to induce the anisotropy, and the thermal stability, optical stability, and electro-optical characteristics thereof can be significantly affected by any remaining or residual unreacted photo-functional groups.

In general, a liquid crystal display can be fabricated by coating a liquid crystal photo-alignment agent on a glass substrate deposited with a transparent indium tin oxide (ITO) conductive layer and heating it to form a liquid crystal alignment film, and then combining two substrates oppositely facing each other and implanting the liquid crystals therebetween. Alternatively, a liquid crystal display can be fabricated by dripping liquid crystals on one substrate and combining it with another substrate oppositely facing the one substrate. In particular, fifth generation, or later, liquid crystal displays used in medium- and large-sized product lines are typically produced using the latter method.

In general, a liquid crystal photo-alignment film can be formed by coating a liquid crystal photo-alignment agent prepared by dissolving polyamic acid or polyimide in an organic solvent on a substrate in a flexo printing method, and then predrying and firing it. When the liquid crystal photo-alignment agent has poor printability, it may have a film thickness deviation, and accordingly may negatively influence display characteristics of a liquid crystal display including the film.

SUMMARY OF THE INVENTION

An exemplary embodiment of the present invention provides a liquid crystal photo-alignment agent. The liquid crystal photo-alignment agent of the present invention can have excellent printability and liquid crystal photo-alignment properties. For example, liquid crystal molecules can be uniformly and stably aligned in a vertical direction using the liquid crystal photo-alignment agent of the present invention and the vertical alignment property thereof may not deteriorate when dropping liquid crystals using a "one drop filling" (ODF) method. Further, the liquid crystal photo-alignment agent of the present invention can be stable under operating conditions.

A further embodiment of the present invention provides a liquid crystal photo-alignment film manufactured using the liquid crystal photo-alignment agent. The liquid crystal photo alignment film can have excellent after-image and electro-optical characteristics.

According to one embodiment of the present invention, a liquid crystal photo-alignment agent is provided that includes an epoxy compound represented by the following Chemical Formula 1 and a polymer comprising polyamic acid, polyimide, or a mixture thereof.

[Chemical Formula 1]

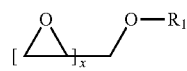

In the above Chemical Formula 1, X is an integer ranging from 1 to 8, and $R_1$ is an organic group derived from a cumarin-based photo-compound, a chalcone-based photo-compound, or a cinnamate-based photo-compound.

The liquid crystal photo-alignment agent can include the epoxy compound in an amount of 0.01 to 60 parts by weight, for example 0.05 to 50 parts by weight, and as another example 0.05 to 30 parts by weight, based on 100 parts by weight of the polymer (polyamic acid, polyimide, or a mixture thereof).

The epoxy compound may comprise at least one compound represented by the following Chemical Formulae 2 to 4, or a combination thereof:

[Chemical Formula 2]

[Chemical Formula 3]

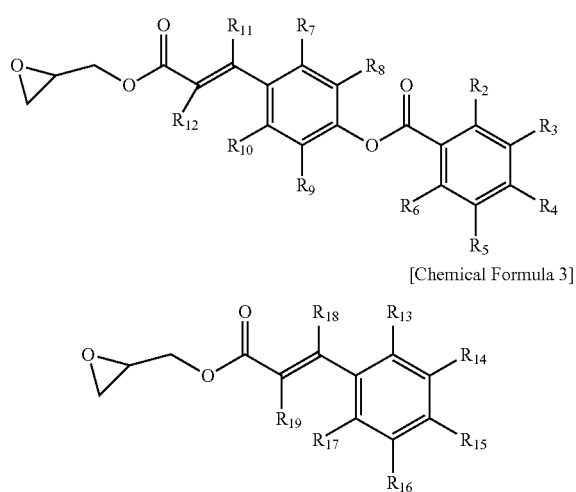

wherein, in the above Chemical Formulae 2 and 3, $R_2$ to $R_6$ and $R_{13}$ to $R_{17}$ are independently hydrogen, substituted or unsubstituted alkyl, substituted or unsubstituted aryl, or substituted or unsubstituted heteroaryl, and $R_7$ to $R_{12}$ and $R_{18}$ to $R_{19}$ are independently substituents selected from the group consisting of hydrogen, C1 to C20 alkyl, C2 to C20 alkoxyalkyl, C1 to C20 haloalkyl, and an aromatic group or substituents selected from the group consisting of C1 to C6 alkyl and an alicyclic group.

[Chemical Formula 4]

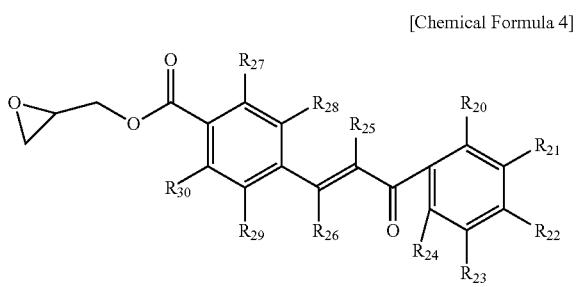

wherein, in the above Chemical Formula 4, $R_{20}$ to $R_{24}$ are independently hydrogen, substituted or unsubstituted alkyl, substituted or unsubstituted aryl, or substituted or unsubstituted heteroaryl, $R_{25}$ and $R_{26}$ are independently hydrogen, halogen, cyano, or substituted or unsubstituted C1 to C12 alkyl, wherein in $R_{25}$ and $R_{26}$, the substituted alkyl is an alkyl substituted with halogen, cyano, or a combination thereof, or is an alkyl comprising one or more non-adjacent $CH_2$ groups substituted with —O—, —CO—O—, —O—CO—, —CH=CH—, or a combination thereof, and $R_{27}$ to $R_{30}$ are independently substituents selected from the group consisting of hydrogen, C1 to C20 alkyl, C2 to C20 alkoxyalkyl, C1 to C20 haloalkyl, and an aromatic group or substituents selected from the group consisting of C1 to C6 alkyl and an alicyclic group.

The polyamic acid may include a repeating unit represented by the following Chemical Formula 5.

[Chemical Formula 5]

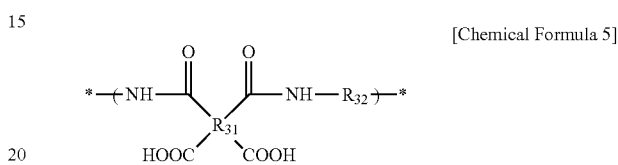

wherein, in the above Chemical Formula 5, $R_{31}$ is a quadrivalent organic group derived from an aliphatic cyclic acid dianhydride or an aromatic acid dianhydride, and $R_{32}$ is a divalent organic group derived from a diamine.

The polyimide may include a repeating unit represented by the following Chemical Formula 6:

[Chemical Formula 6]

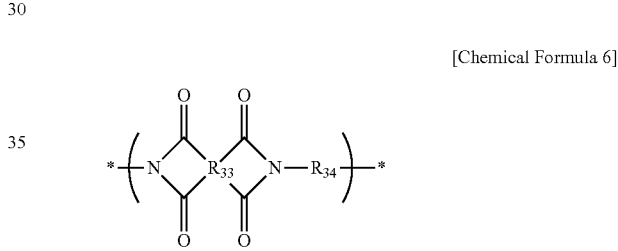

wherein, in the above Chemical Formula 6, $R_{33}$ is a quadrivalent organic group derived from an aliphatic cyclic acid dianhydride or an aromatic acid dianhydride, and $R_{34}$ is a divalent organic group derived from a diamine or a divalent organic group derived from a coumarin-based photodiamine, chalcone-based photo-diamine, or cinnamate-based photo-diamine.

According to another embodiment of the present invention, a liquid crystal photo-alignment film is provided that is manufactured using the liquid crystal photo-alignment agent.

Hereinafter, further embodiments of the present invention will be described in detail.

The liquid crystal photo-alignment agent according to one embodiment of the present invention can provide a liquid crystal photo-alignment film having excellent printability on a substrate and excellent reliability and electro-optical characteristics.

DETAILED DESCRIPTION OF THE EMBODIMENTS

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "alkyl" refers to C1 to C30 alkyl, the term "cycloalkyl" refers to C3 to C30 cycloalkyl, the term "alkylene" refers to C1 to C6 alkylene, the term "cycloalkylene" refers to C3 to C30 cycloalkylene, the term "heterocycloalkylene" refers to C2 to C30 heterocycloalkylene, the term "aryl" refers to C6 to C30 aryl, the term "heteroaryl" refers to C2 to C30 heteroaryl, the term "arylene" refers to C2 to C20 arylene, the term "heteroarylene" refers to C2 to C30 heteroarylene, the term "alkylaryl" refers to C7 to C30 alkylaryl, and the term "halogen" or "halo" refers to F, Cl, Br, I or a combination thereof.

As used herein, the terms "substituted alkyl", "substituted alkylene", "substituted cycloalkylene", "substituted heterocycloalkylene", "substituted aryl", "substituted arylene", "substituted heteroaryl", "substituted heteroarylene", "substituted pyrimidinyl", "substituted pyridinyl", "substituted thiophenyl", "substituted puranyl", "substituted naphthyl", and "substituted phenyl" independently refer to an alkyl, an alkylene, a cycloalkylene, a heterocycloalkylene, an aryl, an arylene, a heteroaryl, a heteroarylene, a pyrimidinyl, a pyridinyl, a thiophenyl, a puranyl, a naphthyl, and a phenyl substituted with halogen, C1 to C30 alkyl, C1 to C30 haloalkyl, C6 to C30 aryl, C2 to C30 heteroaryl, C1 to C20 alkoxy, or a combination thereof.

As used herein, when a specific definition is not otherwise provided, the terms "heterocycloalkylene", "heteroaryl", and "heteroarylene", respectively, refer to cycloalkylene, aryl, and arylene including one to three hetero atoms comprising N, O, S, Si, P, or a combination thereof, with the remaining ring atoms being carbon atoms.

As used herein, when a specific definition is not otherwise provided, the terms "alicyclic group" or "aliphatic cyclic group" refer to C3 to C30 cycloalkyl, C3 to C30 cycloalkenyl, or C3 to C30 cycloalkynyl, and the term "aromatic group" refers to C6 to C30 aryl or C2 to C30 heteroaryl.

In addition, "*" refers to a part connecting the same or different atoms or chemical formulae.

The liquid crystal photo-alignment agent according to one embodiment of the present invention includes an epoxy compound represented by the following Chemical Formula 1, and a polymer comprising polyamic acid, polyimide, or a mixture thereof.

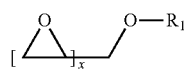

[Chemical Formula 1]

In the above Chemical Formula 1, X is an integer ranging from 1 to 8, and $R_1$ is an organic group derived from a cumarin-based photo-compound, a chalcone-based photo-compound, or a cinnamate-based photo-compound.

Hereinafter, each component is described in detail.

(A) Epoxy Compound

The epoxy compound may be represented by Chemical Formula 1.

The liquid crystal photo-alignment agent may include the epoxy compound in an amount of 0.01 to 60 parts by weight, for example 0.05 to 50 parts by weight, and in another example 0.05 to 30 parts by weight, based on 100 parts by weight of the polymer (polyamic acid, polyimide, or a mixture thereof). In some embodiments, the liquid crystal photo-alignment agent may include the epoxy compound in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the amount of the epoxy compound can be in a range from any of the foregoing amounts to about any other of the foregoing amounts.

When the epoxy compound is included in an amount within these ranges, it can be useful as a photo-alignment agent since it may be suitably photo-polymerized without deteriorating printability and flatness when it is coated on a substrate.

Non-limiting examples of the epoxy compound include at least one compound represented by the following Chemical Formulae 2 to 4 or a combination thereof.

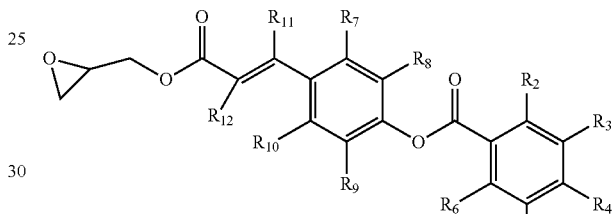

[Chemical Formula 2]

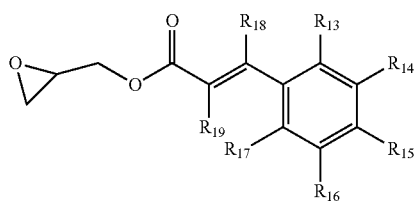

[Chemical Formula 3]

In the above Chemical Formulae 2 and 3, $R_2$ to $R_6$ and $R_{13}$ to $R_{17}$ are independently hydrogen, substituted or unsubstituted alkyl, substituted or unsubstituted aryl, or substituted or unsubstituted heteroaryl, and $R_7$ to $R_{12}$ and $R_{18}$ to $R_{19}$ are independently substituents selected from the group consisting of hydrogen, C1 to C20 alkyl, C2 to C20 alkoxyalkyl, C1 to C20 haloalkyl, and an aromatic group or substituents selected from the group consisting of C1 to C6 alkyl and an alicyclic group.

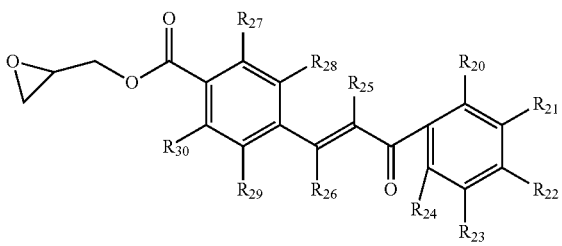

[Chemical Formula 4]

In the above Chemical Formula 4, $R_{20}$ to $R_{24}$ are independently hydrogen, substituted or unsubstituted alkyl, substituted or unsubstituted aryl, or substituted or unsubstituted heteroaryl, $R_{25}$ and $R_{26}$ are independently hydrogen, halogen, cyano, or substituted or unsubstituted C1 to C12 alkyl, wherein in $R_{25}$ and $R_{26}$, the substituted alkyl is an alkyl substituted with halogen, cyano or a combination thereof; or is an alkyl comprising one or more non-adjacent $CH_2$ groups substituted with —O—, —CO—O—, —O—CO—, —CH=CH—, or a combination thereof, and $R_{27}$ to $R_{30}$ are independently substituents selected from the group consisting of hydrogen, C1 to C20 alkyl, C2 to C20 alkoxyalkyl, C1 to C20 haloalkyl, and an aromatic group or substituents selected from the group consisting of C1 to C6 alkyl and an alicyclic group.

The epoxy compounds used in the present invention are prepared by reacting the predetermined carboxylic acid with 2,3-epoxypropyl halide, specifically 2,3-epoxypropyl chloride.

(B) Polymer

The polymer includes polyamic acid, polyimide, or a mixture thereof. The liquid crystal photo-alignment agent may include the polymer in an amount of 0.01 to 30 wt %, for example 1 to 15 wt %, based on 100 wt % of the total solution. In some embodiments, the liquid crystal photo-alignment agent may include the polymer in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of polymer can be in a range from any of the foregoing amounts to about any other of the foregoing amounts.

When the polyamic acid is mixed with polyimide, the mixture may include polyamic acid in an amount of 1 to 99 wt % and polyimide in an amount of 99 to 1 wt %.

In some embodiments, the mixture may include polyamic acid in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 wt %. Further, according to some embodiments of the present invention, the amount of the polyamic acid in the mixture can be in a range from any of the foregoing amounts to about any other of the foregoing amounts.

In some embodiments, the mixture may include polyimide in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 wt %. Further, according to some embodiments of the present invention, the amount of the polyimide in the mixture can be in a range from any of the foregoing amounts to about any other of the foregoing amounts.

(B-1) Polyamic Acid

The polyamic acid for the liquid crystal photopolymer may include any polyamic acid synthesized from an acid dianhydride and a diamine.

The acid dianhydride may include an aliphatic cyclic acid dianhydride, an aromatic acid dianhydride, or a mixture thereof. The diamine may independently include an aromatic diamine or a functional diamine, or a mixture of an aromatic diamine and a functional diamine.

The method of preparing polyamic acid by copolymerizing the acid dianhydride and the diamine may include any conventional method known for copolymerizing the polyamic acid.

A non-limiting example of the polyamic acid according to one embodiment of the present invention may include a repeating unit represented by the following Chemical Formula 5.

[Chemical Formula 5]

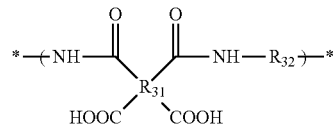

In the above Chemical Formula 5, $R_{31}$ is a quadrivalent organic group derived from an aliphatic cyclic acid dianhydride, or an aromatic acid dianhydride, and $R_{32}$ is a divalent organic group derived from the diamine.

(B-1-1) Acid Dianhydride (B-1-1-1) Aliphatic Cyclic Acid Dianhydride

Examples of the aliphatic cyclic acid dianhydride include without limitation 1,2,3,4-cyclobutanetetracarboxylic acid dianhydride (CBDA), 5-(2,5-dioxotetrahydropuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride CHDA), 1,2,4-tricarboxyl-3-methylcarboxylcyclopentane dianhydride, 1,2,3,4-tetracarboxylcyclopentane dianhydride, and the like, and mixtures thereof.

The quadrivalent organic group derived from the aliphatic cyclic acid dianhydride may have at least one functional group and can be represented by one of the following Chemical Formulae 7 to 11, or a combination thereof.

[Chemical Formula 7]

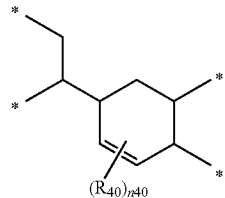

[Chemical Formula 8]

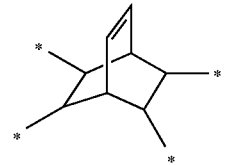

-continued

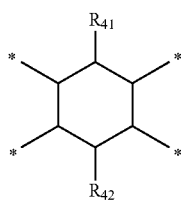
[Chemical Formula 9]

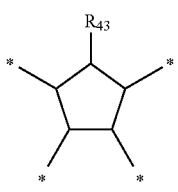
[Chemical Formula 10]

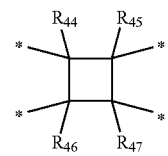
[Chemical Formula 11]

In the above Chemical Formulae 7 to 11, each $R_{40}$ is independently substituted or unsubstituted C1 to C20 alkyl, substituted or unsubstituted aryl, or substituted or unsubstituted heteroaryl, and $n_{40}$ is an integer ranging from 0 to 3, and $R_{41}$ to $R_{47}$ are independently hydrogen, substituted or unsubstituted C1 to C20 alkyl, substituted or unsubstituted aryl, or substituted or unsubstituted heteroaryl.

(B-1-1-2) Aromatic Acid Dianhydride

Examples of the aromatic acid dianhydride include without limitation pyromellitic acid dianhydride (PMDA), biphthalic acid dianhydride (BPDA), oxydiphthalic acid dianhydride (ODPA), benzophenone tetracarboxylic acid dianhydride (BTDA), hexafluoroisopropylidene diphthalic acid dianhydride (6-FDA), and the like, and mixtures thereof.

The quadrivalent organic group derived from the aromatic acid dianhydride may have at least one functional group and can be represented by one of the following Chemical Formulae 12 and 13, or a combination thereof.

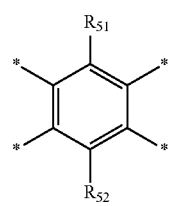
[Chemical Formula 12]

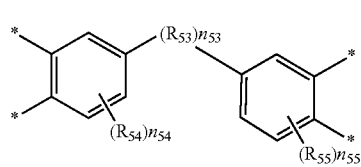
[Chemical Formula 13]

In the above Chemical Formulae 12 and 13, $R_{51}$ and $R_{52}$ are independently hydrogen, substituted or unsubstituted C1 to C20 alkyl, substituted or unsubstituted aryl, or substituted or unsubstituted heteroaryl, each $R_{54}$ and $R_{55}$ is independently substituted or unsubstituted $C_1$ to $C_{20}$ alkyl, substituted or unsubstituted aryl, or substituted or unsubstituted heteroaryl, $n_{54}$ and $n_{55}$ are independently integers ranging from 0 to 3, $R_{53}$ is —O—, —CO—, substituted or unsubstituted alkylene such as —C(CF$_3$)$_2$—, substituted or unsubstituted cycloalkylene, or substituted or unsubstituted heterocycloalkylene, and $n_{53}$ is an integer of 0 or 1.

(B-1-2) Diamine (B-1-2-1) Aromatic Diamine

Examples of the aromatic diamine include without limitation para-phenylenediamine (p-PDA), 4,4-methylene dianiline (MDA), 4,4-oxydianiline (ODA), meta-bisaminophenoxy diphenylsulfone (m-BAPS), para-bisaminophenoxy diphenylsulfone (p-BAPS), 2,2-bis[(aminophenoxy) phenyl]propane (BAPP), 2,2-bisaminophenoxyphenyl hexafluoropropane (HF-BAPP), 1,4-diamino-2-methoxybenzene, and the like, and mixtures thereof.

The divalent organic group derived from the aromatic diamine may have at least one functional group and can be represented by one of the following Chemical Formulae 14 to 16 or a combination thereof.

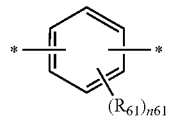
[Chemical Formula 14]

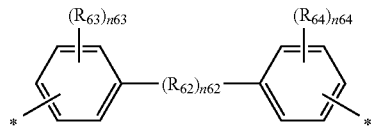
[Chemical Formula 15]

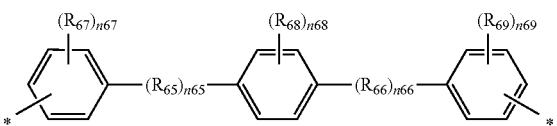
[Chemical Formula 16]

In the above Chemical Formulae 14 to 16, each $R_{61}$, $R_{63}$, $R_{64}$, and $R_{67}$ to $R_{69}$ is independently substituted or unsubstituted C1 to C20 alkyl, substituted or unsubstituted aryl, or substituted or unsubstituted heteroaryl, wherein r the above alkyl, aryl, or heteroaryl can further optionally include —O—, —COO—, —CONH—, or —COO—, $R_{62}$, $R_{65}$ and $R_{66}$ are independently —O—, —SO$_2$—, or —C(R')(R")— such as —C(CF$_3$)$_2$— wherein R' and R" are independently hydrogen or substituted or unsubstituted C1 to C6 alkyl, $n_{61}$, $n_{63}$, $n_{64}$, and $n_{67}$ to $n_{69}$ are independently integers ranging from 0 to 4, and $n_{62}$, $n_{65}$, and $n_{66}$ are independently integers of 0 or 1.

(B-1-2-2) Functional Diamine

A functional diamine may be mixed with the aromatic diamine while preparing the polyamic acid in order to provide a liquid crystal alignment layer with an excellent alignment property that easily controls the pretilt angle of liquid crystal molecules. The functional diamine may include compounds represented by the following Chemical Formulae 17 to 19 or a mixture thereof. When the functional diamine is mixed with the aromatic diamine, some of the obtained polyamic acid includes a functional group derived from the aromatic diamine, and the other includes a divalent organic acid derived from the functional diamine.

[Chemical Formula 17]

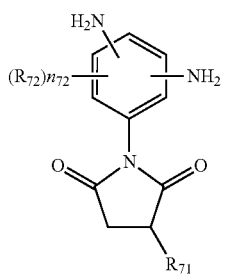

In the above Chemical Formula 17, $R_{71}$ is hydrogen, substituted or unsubstituted C1 to C20 alkyl, substituted or unsubstituted aryl, or substituted or unsubstituted heteroaryl, each $R_{72}$ is substituted or unsubstituted C1 to C20 alkyl, substituted or unsubstituted aryl, or substituted or unsubstituted heteroaryl, and $n_{72}$ is an integer ranging from 0 to 3.

[Chemical Formula 18]

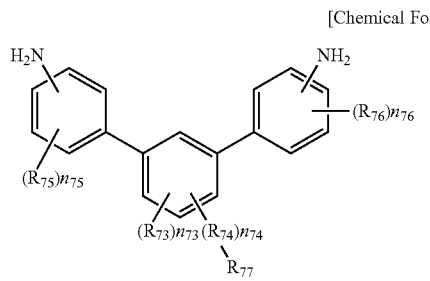

In the above Chemical Formula 18, each $R_{73}$, $R_{75}$, and $R_{76}$ is independently substituted or unsubstituted C1 to C20 alkyl, substituted or unsubstituted aryl, or substituted or unsubstituted heteroaryl, $R_{74}$ is —O—, —COO—, —CONH—, —OCO—, or substituted or unsubstituted C1 to C10 alkylene, $R_{77}$ is hydrogen, substituted or unsubstituted C1 to C20 alkyl, substituted or unsubstituted aryl, substituted or unsubstituted heteroaryl, wherein the alkyl, aryl, or heteroaryl can further optionally include —O—, —COO—, —CONH—, or —OCO—, $n_{73}$ is an integer ranging from 0 to 3, $n_{75}$ and $n_{76}$ are independently integers ranging from 0 to 4, and $n_{74}$ is an integer of 0 or 1.

[Chemical Formula 19]

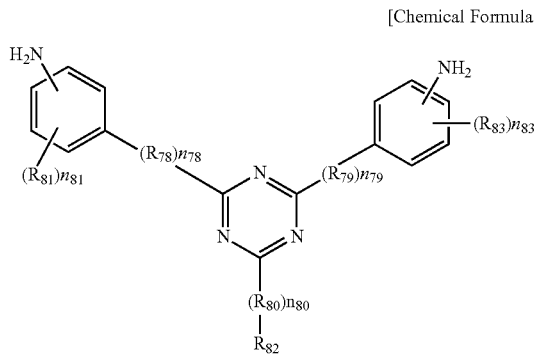

In the above Chemical Formula 19, each $R_{81}$ and $R_{83}$ is independently substituted or unsubstituted C1 to C20 alkyl, substituted or unsubstituted aryl, or substituted or unsubstituted heteroaryl, $R_{82}$ is hydrogen, substituted or unsubstituted C1 to C20 alkyl, substituted or unsubstituted aryl, or substituted or unsubstituted heteroaryl, $R_{78}$ and $R_{79}$ are independently —O— or —COO—, $R_{80}$ is —O—, —COO—, —CONH—, or —COO—, $n_{81}$ and $n_{83}$ are independently integers ranging from 0 to 4, and $n_{78}$ to $n_{80}$ are independently integers of 0 or 1.

(B-2) Polyimide

The polyimide may include any one of a polyimide polymer or a polyimide photopolymer used for a liquid crystal photopolymer.

The polyimide may be prepared by imidizing the polyamic acid represented by Chemical Formula 1 or by synthesizing at least one kind of photo-diamine and acid dianhydride. Methods for preparing a polyimide polymer by imidizing polyamic acid and methods for preparing a polyimide photopolymer from a photo-diamine and an acid dianhydride are well known to the skilled artisan and can be conducted without undue experimentation.

Non-limiting examples of the polyimide according to one embodiment of the present invention may include a repeating unit represented by the following Chemical Formula 6.

[Chemical Formula 6]

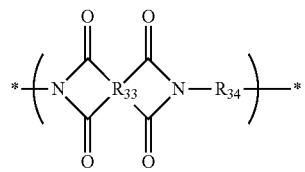

In the above Chemical Formula 6, $R_{33}$ is a quadrivalent organic group derived from an aliphatic cyclic acid dianhydride or an aromatic acid dianhydride, and $R_{34}$ is a divalent organic group derived from a diamine, or a divalent organic group derived from coumarin-based photo-diamine, chalcone-based photo-diamine, or cinnamate-based photo-diamine.

(B-2-1) Acid Dianhydride

The acid dianhydride for the polyimide may include an aliphatic cyclic acid dianhydride, an aromatic acid dianhydride, or a mixture thereof, and the detailed description is the same as for polyamic acid.

(B-2-2) Photo-diamine

The photo-diamine used for preparing the polyimide may include cinnamate-based photo-diamine, chalcone-based photo-diamine, coumarine-based photo-diamine, or a mixture thereof.

The cinnamate-based photo-diamine may include a compound represented by the following Chemical Formula 20, a compound represented by the following Chemical Formula 21, or a mixture thereof; the chalcone-based photo-diamine may include a compound represented by the following Chemical Formula 22; and the coumarine-based photo-diamine may include a compound represented by the following Chemical Formula 23.

[Chemical Formula 20]

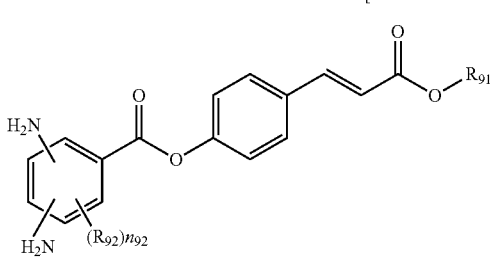

In the above Chemical Formula 20, $R_{91}$ is hydrogen, substituted or unsubstituted alkyl, substituted or unsubstituted aryl, or substituted or unsubstituted heteroaryl, each $R_{92}$ is substituted or unsubstituted alkyl, substituted or unsubstituted aryl, or substituted or unsubstituted heteroaryl, and $n_{92}$ is an integer of 0 to 3.

[Chemical Formula 21]

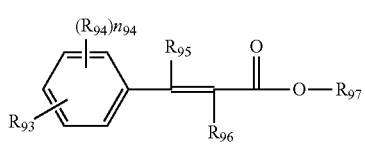

In the above Chemical Formula 21, $R_{97}$ is an aromatic diamine group, a diamine group substituted with substituted or unsubstituted C1 to C24 linear or branched alkylene, or a combination thereof, wherein in $R_{97}$, the substituted alkylene is an alkylene substituted with halogen, cyano, or a combination thereof; or is an alkylene including one or more non-adjacent $CH_2$ groups substituted with substituted or unsubstituted arylene, substituted or unsubstituted heteroarylene, substituted or unsubstituted cycloalkylene, substituted or unsubstituted heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH=CH—, —C≡C—, —O—CO—O— (wherein R' is hydrogen or substituted or unsubstituted C1 to C6 alkyl), or a combination thereof, each $R_{94}$ is substituted or unsubstituted C1 to C20 alkyl, substituted or unsubstituted aryl, or substituted or unsubstituted heteroaryl, and $n_{94}$ is an integer ranging from 0 to 4, $R_{95}$ and $R_{96}$ are independently hydrogen, halogen, cyano, or substituted or unsubstituted C1 to C12 alkyl, wherein in $R_{95}$ and $R_{96}$, the substituted alkyl is an alkyl substituted with halogen, cyano or a combination thereof; or is an alkyl including one or more non-adjacent $CH_2$ groups substituted with —O—, —CO—O—, —O—CO—, —CH=CH—, or a combination thereof, and $R_{93}$ is substituted or unsubstituted alkyl, substituted or unsubstituted alkylaryl, substituted or unsubstituted cycloalkyl, substituted or unsubstituted pyrimidinyl, substituted or unsubstituted pyridinyl, substituted or unsubstituted thiophenyl, substituted or unsubstituted puranyl, substituted or unsubstituted naphthyl, or substituted or unsubstituted phenyl, wherein in $R_{93}$, the substituted alkyl is an alkyl substituted with halogen, cyano, or a combination thereof; or is an alkyl including one or more non-adjacent $CH_2$ groups substituted with —O—, —CO—O—, —O—CO—, —CH=CH—, or a combination thereof, and the substituted alkylaryl is an alkylaryl including one or more non-adjacent $CH_2$ groups substituted with —O—, —CO—O—, —O—CO—, or —CH=CH—.

[Chemical Formula 22]

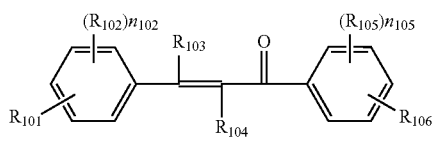

In the above Chemical Formula 22, $R_{101}$ is an aromatic diamine group, a diamine group substituted with substituted or unsubstituted C1 to C24 linear or branched alkylene, or a combination thereof, wherein in $R_{101}$, the substituted alkylene is an alkylene substituted with halogen, cyano, or a combination thereof; or is an alkylene including one or more non-adjacent $CH_2$ groups substituted with substituted or unsubstituted arylene, substituted or unsubstituted heteroarylene, substituted or unsubstituted cycloalkylene, substituted or unsubstituted heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH=CH—, —C≡C—, —O—CO—O— (where R' is hydrogen or substituted or unsubstituted C1 to C6 alkyl), or a combination thereof, each $R_{102}$ and $R_{105}$ is independently substituted or unsubstituted C1 to C20 alkyl, substituted or unsubstituted aryl, or substituted or unsubstituted hetero aryl, and $n_{102}$ and $n_{105}$ are independently integers ranging from 0 to 4, $R_{103}$ and $R_{104}$ are independently hydrogen, halogen, cyano, or substituted or unsubstituted C1 to C12 alkyl, wherein in $R_{103}$ and $R_{104}$, the substituted alkyl is an alkyl substituted with halogen, cyano, or a combination thereof; or is an alkyl including one or more non-adjacent $CH_2$ groups substituted with —O—, —CO—O—, —O—CO—, —CH=CH—, or a combination thereof, and $R_{106}$ is substituted or unsubstituted alkyl, substituted or unsubstituted alkylaryl, substituted or unsubstituted cycloalkyl, substituted or unsubstituted pyrimidinyl, substituted or unsubstituted pyridinyl, substituted or unsubstituted thiophenyl, substituted or unsubstituted puranyl, substituted or unsubstituted naphthyl, or substituted or unsubstituted phenyl, wherein in $R_{106}$, the substituted alkyl is an alkyl substituted with halogen, cyano, or a combination thereof; or is an alkyl including one or more non-adjacent $CH_2$ groups substituted with —O—, —CO—O—, —O—CO—, —CH=CH—, or a combination thereof, and the substituted alkylaryl is an alkylaryl including one or more non-adjacent $CH_2$ groups substituted with —O—, —CO—O—, —O—CO—, —CH=CH—, or a combination thereof.

[Chemical Formula 23]

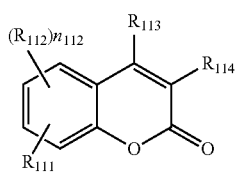

In the above Chemical Formula 23, $R_{111}$ is an aromatic diamine group, a diamine group substituted with substituted or unsubstituted C1 to C24 linear or branched alkylene, or a combination thereof, wherein in $R_{111}$, the substituted alkylene is an alkylene substituted with halogen, cyano, or a combination thereof; or is an alkylene including one or more non-adjacent $CH_2$ groups substituted with substituted or unsubstituted arylene, substituted or unsubstituted heteroarylene, substituted or unsubstituted cycloalkylene, substituted or unsubstituted heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH=CH—, —C≡C—, —O—CO—O— (where R' is hydrogen or substituted or unsubstituted C1 to C6 alkyl), or a combination thereof, each $R_{112}$ is substituted or unsubstituted C1 to C20 alkyl, substituted or unsubstituted aryl, or substituted or unsubstituted heteroaryl, and $n_{112}$ is an integer ranging from 0 or 4, and $R_{113}$ and $R_{114}$ are independently hydrogen, halogen, cyano, or substituted or unsubstituted C1 to C12 alkyl, wherein in $R_{113}$ and $R_{114}$, the substituted alkyl is an alkyl substituted with halogen, cyano, or a combination thereof; or is an alkyl including one or more non-adjacent $CH_2$ groups substituted with —O—, —CO—O—, —O—CO—, —CH=CH—, or a combination thereof.

(D) Solvent

A liquid crystal photo-alignment agent according to one embodiment can further optionally include a solvent.

The solvent may include any solvent known in the art capable of dissolving an epoxy compound and a polymer.

Non-limiting examples of solvents may include N-methyl-2-pyrrolidone, N,N-dimethyl acetamide, N,N-dimethyl formamide, dimethyl sulfoxide, γ-butyro lactone, phenol-based solvents such as a meta-cresol, phenols, a halogenated phenols, and the like, and combinations thereof.

In addition, the solvent may further include a poor solvent. Non-limiting examples of the poor solvent include alcohols, ketones, esters, ethers, hydrocarbons, halogenated hydrocarbons solvents, and the like, and combinations thereof, as long as the soluble polyimide is not deposited. The poor solvent lowers surface energy of a liquid crystal photo-alignment agent and improves its spreading capability and flatness when the liquid crystal photo-alignment agent is coated onto a surface.

The liquid crystal photo-alignment agent may include the poor solvent in an amount of 1 to 90 volume %, based on the total amount of the solvent, for example 1 to 70 volume %. In some embodiments, the liquid crystal photo-alignment agent may include the poor solvent in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 volume %. Further, according to some embodiments of the present invention, the amount of poor solvent can be in a range from any of the foregoing amounts to about any other of the foregoing amounts. Non-limiting examples of the poor solvent include methanol, ethanol, isopropanol, cyclohexanol, ethylene glycol, propylene glycol, 1,4-butanediol, triethylene glycol, acetone, methylethylketone, cyclohexanone, methyl acetate, ethyl acetate, butyl acetate, diethyl hydroxide, malonic acid ester, diethyl ether, ethylene glycol monomethyl ether, ethylene glycol monoethyl ether, ethylene glycol phenyl ether, ethylene glycol phenyl methyl ether, ethylene glycol phenyl ethyl ether, ethylene glycol dimethylethyl, diethylene glycol dimethylethyl, diethylene glycol ether, diethylene glycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl butanoic acid methyl, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and the like, and combinations thereof.

The amount of solvent in the liquid crystal photo-alignment agent is not limited. According to one embodiment of the present invention, the liquid crystal photo-alignment agent may include solvent in an amount selected to provide a solid content of the liquid crystal photo-alignment agent ranging from 1 to 48 wt %. In another embodiment, the solid content can range from 3 to 15 wt %; and in a further embodiment, the solid content can range from 5 to 10 wt %. In some embodiments, the liquid crystal photo-alignment agent may include the solvent in an amount sufficient to provide a solids content of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 wt %. Further, according to some embodiments of the present invention, the amount of solvent can be in an amount sufficient to provide a solid content in a range from any of the foregoing amounts to about any other of the foregoing amounts.

When the liquid crystal photo-alignment agent includes a solid content in an amount within these ranges, the liquid crystal photo-alignment agent may not be influenced by the substrate surface during the printing process, so as to maintain suitable film uniformity and viscosity, to prevent the uniformity of a layer formed by printing from deteriorating, and to provide suitable transmittance.

(E) Other Additive(s)

The liquid crystal photo-alignment agent according to one embodiment may further include a silane coupling agent, a surfactant, or a combination thereof. Silane coupling agents and surfactants suitable for use in a liquid crystal photo-alignment agent are well known in the art and can be used in conventional amounts.

The liquid crystal photo-alignment film according to another embodiment is fabricated using the liquid crystal photo-alignment agent.

The liquid crystal photo-alignment film may be fabricated by coating the liquid crystal photo-alignment agent on a substrate. Methods of coating the liquid crystal photo-alignment agent on a substrate are well known in the art and may include without limitation spin coating, flexo printing, Inkjet printing, and on the like. The film formed by flexo printing can have excellent film uniformity and may be easily large-sized, so it is generally used.

The substrate may include any substrate as long as it has a high transparency. Non-limiting examples of the substrate may include glass substrates and plastic substrates such as acrylic substrates and polycarbonate substrates. A substrate formed with the ITO electrode for driving the liquid crystal may also be used, which can simplify the process.

After uniformly coating the liquid crystal photo-alignment agent on a substrate to improve the film uniformity, the coated substrate may be pre-dried at a temperature of between room temperature and 200° C., for example at a temperature of between 30 and 150° C., and as another example at a temperature of between 40 and 120° C., for 1 to 100 minutes. The pre-drying process can provide a uniform film with less deviation in the thickness thereof by controlling volatilization of each component.

Subsequently, the coated substrate can be baked at a temperature of 80 to 300° C., for example 120 to 280° C., for 5 to 300 minutes to completely evaporate the solvent, to provide a liquid crystal photo-alignment film.

The obtained liquid crystal photo-alignment film can be aligned in one axis with polarization ultraviolet (UV) irradiation, or a liquid crystal display (LCD) can be provided without subjecting the same to a one axis alignment in some applications such as a vertical alignment layer.

The liquid crystal photo-alignment film according to one embodiment can be exposed by light with energy of 10 mJ to 5000 mJ for 0.1 to 180 minutes to align the same in one axis. When it is aligned in one axis while the exposure intensity is decreased as above, the double bond included in the polyimide photopolymer is completely removed.

The following examples illustrate the present invention in more detail. These examples, however, should not in any sense be interpreted as limiting the scope of the present invention.

A person having ordinary skill in this art can sufficiently understand parts of the present invention that are not specifically described.

Preparation Example 1

Preparing Epoxy Compound (2a)

A epoxy compound represented by Chemical Formula 2a is prepared according to the following Reaction Scheme 1.

[Reaction Scheme 1]

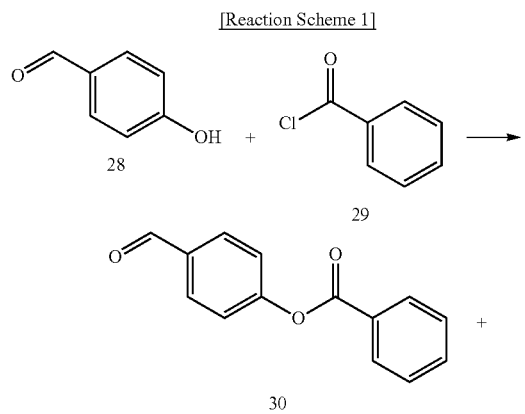

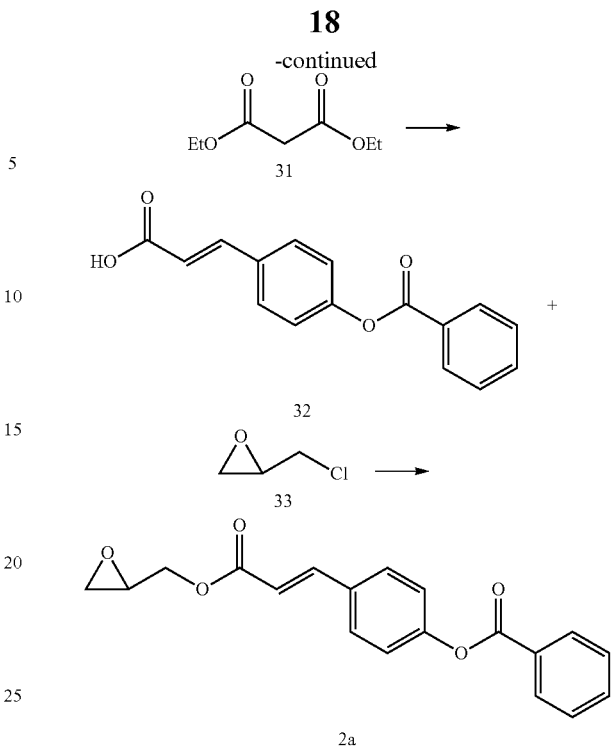

10 g of 4-hydroxybenzaldehyde (Chemical Formula 28) is dissolved by adding into 50 g of tetrahydrofuran (THF) at 0° C., and 6.1 g of triethylamine ($Et_3N$) are added thereto.

7 g of benzoyl chloride (Chemical Formula 29) is added thereto by using a dropping funnel and then the mixture is reacted, followed by an extraction using ethyl acetate (EA) and drying with an anhydrous sodium sulfate ($Na_2SO_4$) to obtain Chemical Formula 30 (yield: 93%).

10.2 g of Chemical Formula 30 is dissolved by adding into 45 g of ethanol (EtOH) and 4.2 g of potassium ethoxide are added thereto and stirred for 30 minutes. 7.2 g of diethyl malonate (Chemical Formula 31) is added thereto and stirred at 25° C. for 2 hours. Then, 1N NaOH solution is added thereto and the mixture is heated up to 100° C., stirred at 100° C. for 24 hours and subsequently the temperature is dropped to 25° C. The mixture is neutralized with 1N HCl, followed by an extraction using methylene chloride (MC) and drying with an anhydrous sodium sulfate ($Na_2SO_4$) to obtain Chemical Formula 32 (yield: 84%).

10.2 g of Chemical Formula 32 is dissolved by adding into 40 g of tetrahydrofuran (THF) and 4.2 g of triethylamine ($Et_3N$) and 3.5 g of 2,3-epoxypropyl chloride (Chemical Formula 33) are added thereto at 25° C. and stirred for 3 hours. Then the solvents are removed by using a rotary evaporator. 1N NaOH solution is added thereto and stirred for 2 hours, followed by an extraction using methylene chloride (MC) and drying with an anhydrous sodium sulfate ($Na_2SO_4$) to obtain Chemical Formula 2a (yield: 91%).

Preparation Example 2

Preparing Epoxy Compound (3a)

A epoxy compound represented by Chemical Formula 3a is prepared according to the following Reaction Scheme 2.

[Reaction Scheme 2]

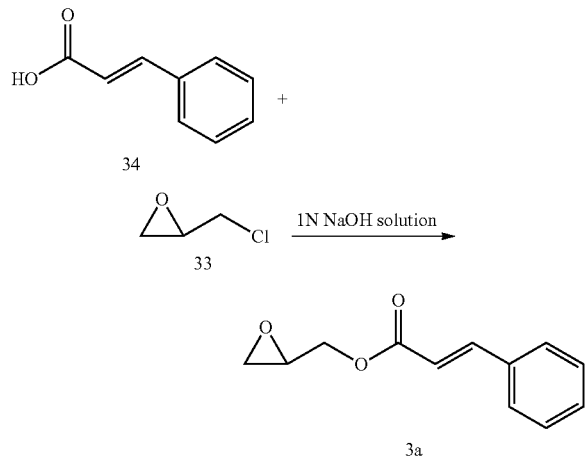

8.9 g of cinnamic acid (Chemical Formula 34) is dissolved by adding into 60 g of tetrahydrofuran (THF) and 6.7 g of triethylamine (Et₃N) and 5.6 g of 2,3-epoxypropyl chloride (Chemical Formula 33) are added thereto at 25° C. and stirred for 3 hours. Then the solvents are removed by using a rotary evaporator. 1N NaOH solution is added thereto and stirred for 2 hours, followed by an extraction using methylene chloride (MC) and drying with an anhydrous potassium carbonate (K₂CO₃) to obtain Chemical Formula 3a (yield: 90%).

Preparation Example 3

Preparing Epoxy Compound (4a)

A epoxy compound represented by Chemical Formula 4a is prepared according to the following Reaction Scheme 3.

[Reaction Scheme 3]

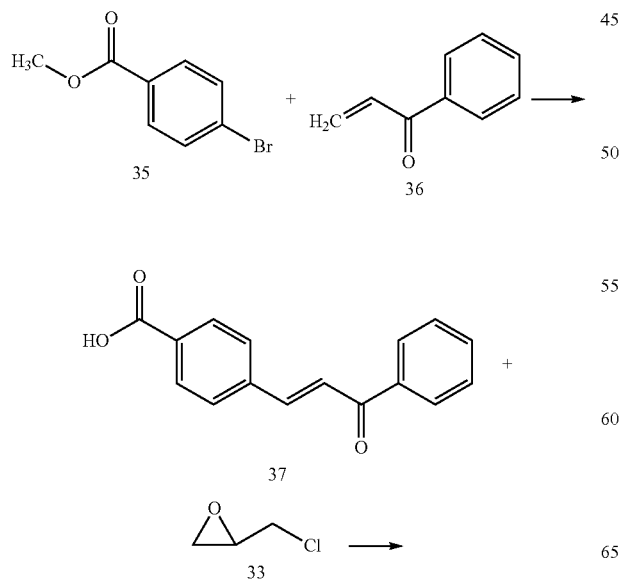

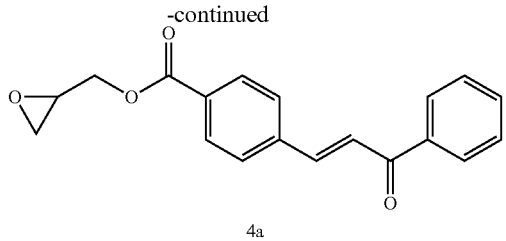

12.9 g of p-bromophenylmethyl ester (Chemical Formula 35), 7.9 g of ethenyl phenyl ketone (Chemical Formula 36), 2.7 g of palladium (II) acetate (Pd(OAc)₂), and 3.1 g of triphenylphosphine (PPh₃) are dissolved with 60 g of dimethylformamide (DMF) under nitrogen (N₂) atmosphere. 12.1 g of triethylamine (Et₃N) are added thereto and the mixture is heated up to 95° C. Then deionized water is added thereto and the solvents are removed by using a rotary evaporator, followed by an extraction using methylene chloride (MC) and water. Then, residual metal catalysts are removed by using celite containing an anhydrous magnesium sulfate (MgSO₄) to obtain Chemical Formula 37 (yield: 73%).

11.1 g of Chemical Formula 37 is dissolved by adding into 44 g of tetrahydrofuran (THF) and 4.9 g of triethylamine (Et₃N) and 4.1 g of 2,3-epoxypropyl chloride (Chemical Formula 33) are added thereto at 25° C. and stirred for 3 hours. Then the solvents are removed by using a rotary evaporator. 1N NaOH solution is added thereto and stirred for 2 hours, followed by an extraction using methylene chloride (MC) and drying to obtain Chemical Formula 4a (yield: 89%).

Preparation Example 4

Preparing Polyamic Acid (PAA-1)

0.7 moles of paraphenylenediamine and 0.3 moles of functional diamine 3,5-diaminophenyldecyl succinimide represented by the following Chemical Formula 24 are introduced into a four-neck flask mounted with an agitator, a temperature controller, a nitrogen gas injector, and a condenser while nitrogen is passed therethrough, and then N-methyl-2-pyrrolidone (NMP) is added to provide a mixed solution.

[Chemical Formula 24]

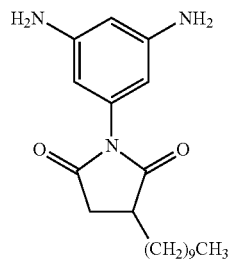

1.0 mole of solid 1,2,3,4-cyclobutanetetracarboxylic acid dianhydride is vigorously agitated with the mixed solution. The solid is added in an amount of 20 wt %, and the reaction is carried out at a temperature between 30° C. and 50° C. for 10 hours to provide a polyamic acid resin. A mixed organic solvent of N-methyl-2-pyrrolidone and γ-butyrolactone is added to the obtained polyamic acid resin and agitated at room temperature for 24 hours to provide a polyamic acid solution (PAA-1) having a solid content of 8 wt %.

Preparation Example 5

Preparing Polyimide (SPI-1)

0.8 moles of phenylenediamine and 0.2 moles of diamine 3,5-diaminophenyldecyl succinimide represented by the above Chemical Formula 24 are introduced into a four-neck flask mounted with an agitator, a temperature controller, a nitrogen gas injector, and a condenser while nitrogen is passed therethrough, and then N-methyl-2-pyrrolidone (NMP) is added to provide a mixed solution.

1.0 mole of solid 1,2,3,4-cyclobutanetetracarboxylic acid dianhydride is vigorously agitated with the mixed solution. The solid is added in an amount of 20 wt %, and the reaction is carried out with maintaining the temperature between 30° C. and 50° C. for 10 hours to provide a polyamic acid resin.

3.0 moles of acetic acid anhydride and 5.0 moles of pyridine are added to the obtained polyamic acid solution and heated to 80° C., and then it is reacted for 6 hours and the catalyst and the solvent are removed through evaporation to provide a soluble polyimide resin having a solid content of 20 wt %.

A mixed organic solvent of N-methyl-2-pyrrolidone and γ-butyrolactone is added to the obtained polyimide resin and agitated at room temperature for 24 hours to provide a polyimide solution (SPI-1) having a solid content of 8 wt %.

Fabricating Liquid Crystal Photo-Aligning Agent

Example 1

80 g of a PM-1 solution having a solid content of 8 wt % obtained from Preparation Example 4 is added to 20 g of an SPI-1 solution having 8 wt % of the solid obtained from Preparation Example 5 to provide a polymer solution. The epoxy compound represented by the following Chemical Formula 25 is added to the polymer solution in an amount of 0.05 parts by weight based on 100 parts by weight of the total polymer, and agitated for 24 hours while nitrogen is passed therethrough. Subsequently, it is filtered through a filter having a particle diameter of 0.1 μm to provide a liquid crystal photo-alignment agent (hereinafter referred to as PSPI-1) having a solid content of 8 wt %.

[Chemical Formula 25]

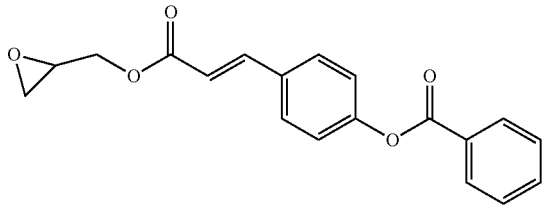

Example 2

A liquid crystal photo-alignment agent (hereinafter referred to as PSPI-2) having a solid content of 8 wt % is prepared in accordance with the same procedure as in Example 1, except that the epoxy compound is added in an amount of 30 parts by weight based on 100 parts by weight of the polymer compound.

Example 3

A liquid crystal photo-alignment agent (hereinafter referred to as PSPI-3) having a solid content of 8 wt % is prepared in accordance with the same procedure as in Example 1, except that the epoxy compound is added in an amount of 50 parts by weight based on 100 parts by weight of the polymer compound.

Example 4

80 g of a PAA-1 solution having a solid content of 8 wt % obtained from Preparation Example 4 is added to 20 g of an SPI-1 solution having a solid content of 8 wt % obtained from Preparation Example 5 to provide a polymer solution. The epoxy compound represented by the following Chemical Formula 26 is added to the polymer solution in an amount of 0.05 parts by weight based on 100 parts by weight of the total polymer, and agitated for 24 hours while nitrogen is passed therethrough. Subsequently, it is filtered through a filter having a particle diameter of 0.1 μm to provide a liquid crystal photo-alignment agent (hereinafter referred to as PSPI-4) having a solid content of 8 wt %.

[Chemical Formula 26]

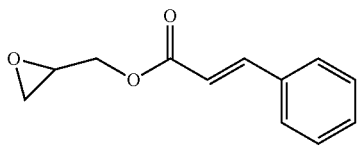

Example 5

A liquid crystal photo-alignment agent (hereinafter referred to as PSPI-5) having a solid content of 8 wt % is prepared in accordance with the same procedure as in Example 4, except that the epoxy compound is added in an amount of 30 parts by weight based on 100 parts by weight of the polymer compound.

Example 6

A liquid crystal photo-alignment agent (hereinafter referred to as PSPI-6) having a solid content of 8 wt % is prepared in accordance with the same procedure as in Example 4, except that the epoxy compound is added in an amount of 50 parts by weight based on 100 parts by weight of the polymer compound.

Example 7

80 g of a PAA-1 solution having a solid content of 8 wt % obtained from Preparation Example 4 is added to 20 g of an SPI-1 solution having a solid content of 8 wt % obtained from Preparation Example 5 to provide a polymer solution. The epoxy compound represented by the following Chemical Formula 27 is added to the polymer solution in an amount of 0.05 parts by weight based on 100 parts by weight of the polymer compound and agitated for 24 hours while nitrogen is passed therethrough. Subsequently, it is filtered through a filter having a particle diameter of 0.1 μm to provide a liquid crystal photo-alignment agent (hereinafter referred to as PSPI-7) having a solid content of 8 wt %.

[Chemical Formula 27]

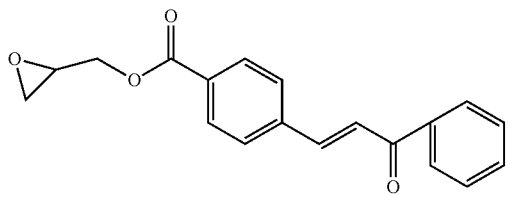

Example 8

A liquid crystal photo-alignment agent (hereinafter referred to as PSPI-8) having a solid content of 8 wt % is prepared in accordance with the same procedure as in Example 7, except that the epoxy compound is added in an amount of 30 parts by weight based on 100 parts by weight of the polymer compound.

Example 9

A liquid crystal photo-alignment agent (hereinafter referred to as PSPI-9) having a solid content of 8 wt % is prepared in accordance with the same procedure as in Example 7, except that the epoxy compound is added in an amount of 50 parts by weight based on 100 parts by weight of the polymer compound.

Comparative Example 1

100 g of a PAA-1 solution having a solid content of 8 wt % obtained from Preparation Example 4 is agitated for 24 hours while nitrogen is passed therethrough and filtered through a filter having a particle diameter of 0.1 µm to provide a liquid crystal alignment agent (hereinafter referred to as PSPI-10) having a solid content of 8 wt %.

Comparative Example 2

100 g of an SPI-1 solution having a solid content of 8 wt % obtained from Preparation Example 5 is agitated for 24 hours while nitrogen is passed therethrough and filtered through a filter having a particle diameter of 0.1 µm to provide a liquid crystal alignment agent (hereinafter referred to as PSPI-11) having a solid content of 8 wt %.

Comparative Example 3

80 g of a PAA-1 solution having a solid content of 8 wt % obtained from Preparation Example 4 is added to 20 g of an SPI-1 solution having a solid content of 8 wt % obtained from Preparation Example 5, agitated for 24 hours while nitrogen is passed therethrough, and filtered through a filter having a particle diameter of 0.1 µm to provide a liquid crystal alignment agent (hereinafter referred to as PSPI-12) having a solid content of 8 wt %.

(Assessment of Printability and End Terminal Film Uniformity)

Each liquid crystal photo-alignment agent obtained from Examples 1 to 9 and Comparative Examples 1 to 3 is flexo printed on a glass substrate with ITO by an alignment layer printer (CZ 200®, manufactured by Nakan Corporation), and the printed substrate is allowed to stand on a hot plate of 50 to 90° C. for 2 to 5 minutes to pre-dry the coat.

After pre-drying the substrate, the substrate is baked on a hot plate at 200 to 230° C. for 10 to 30 minutes and exposed to energy of 10 mJ to 5000 mJ for 0.1 to 180 minutes to provide a substrate with a liquid crystal photo-alignment film.

The film surface of the liquid crystal photo-alignment film is observed by the naked eye and an electron microscope (MX50®, manufactured by Olympus Corporation) across the entire surface of substrate (central and end terminal parts) to determine printability (pinhole and stains) and film thickness change, and the results are shown in the following Table 1.

In the following Table 1, the printability is determined as good in the case of having 0 to 3 pinholes, moderate in the case of having 4 to 6 pinholes, and bad in the case of having more than 6 pinholes; the stains is determined as good in the case of no strains, and bad in the case of observing stains; and the film uniformity is determined as good in the case of having a thickness deviation of less than 0.005 µm, moderate in the case of having a thickness deviation of 0.005 to 0.01 µm, and poor in the case of having a thickness deviation of more than 0.01 µm.

(Alignment Property of Liquid Crystal Photo-Alignment Film)

A liquid crystal cell is fabricated in order to determine the alignment property of the photo-alignment agent. The liquid crystal cell is fabricated as follows.

A standardized-size ITO glass substrate is patterned by photolithography to provide a square of ITO having a size of 1.5 cm×1.5 cm and an ITO electrode shape for applying a voltage and to remove the other parts.

Each liquid crystal photo-alignment agent obtained from Examples 1 to 8 and Comparative Examples 1 to 3 is coated on the patterned ITO substrate by spin coating to provide a thickness of 0.1 µm and cured at 70° C. and 210° C.

Two cured ITO substrates are exposed at a predetermined angle and with predetermined energy using an exposer (UIS-S2021J7-YD01, Ushio LPUV) and disposed in a direction opposing each other (for VA mode, 90 degrees), and they are joined while maintaining a cell gas of 4.75 µm to correspond to the shapes of the upper and lower ITO substrates. The light source for the exposure is a 2 kW deep UV lamp (UXM-2000).

The obtained cell is filled with a liquid crystal material, and the liquid crystal alignment property is observed by a perpendicularly polarized optical microscope. The results are shown in the following Table 1.

(Electro-Optical Characteristics of Liquid Crystal Photo-Alignment Layer)

The electrical characteristic and optical characteristic of the liquid crystal photo-alignment film are measured with a liquid crystal cell having a cell gap of 4.75 µm to determine a voltage-transmission curve, a voltage holding ratio, and a residual DC voltage.

Hereinafter, the electrical and optical characteristics are simply described referring to the voltage-transmission curve, the voltage holding ratio, and the residual DC voltage.

The voltage-transmission curved line is one of important electrical and optical characteristics, and is one factor for determining the driving voltage of a liquid crystal display (LCD). It is a standardized curve of which the quantity of the brightest light is considered to be 100% and the quantity of the darkest light is considered to be 0%.

The voltage holding ratio represents the degree that the exterior electric source and the floating liquid crystal layer hold the charged voltage during an undefined period in an active matrix TFT-LCD, and a value approaching 100% is ideal.

The residual DC voltage represents a voltage applied to the liquid crystal layer by absorbing ionized impurities of the liquid crystal layer to the alignment layer without applying the exterior voltage, and a lower value is better. A method of measuring the residual DC voltage generally includes a method of using flicker and a method of using a curve (C-V) of electrical capacity change of the liquid crystal layer depending upon DC voltage application.

The results of the electrical and optical characteristics of the liquid crystal photo-alignment film using the liquid crystal cell are shown in the following Table 1.

TABLE 1

| Samples | Printability | Film uniformity | Photo-alignment property | Voltage-transmission | Voltage holding ratio (%) room temperature 60 Hz | Voltage holding ratio (%) room temperature 10 Hz | Residual DC voltage (by C-V) |
|---|---|---|---|---|---|---|---|
| Example 1 | Good | Good | Good | Good | 99.22 | 99.02 | 45 |
| Example 2 | Good | Good | Good | Good | 99.26 | 99.09 | 53 |
| Example 3 | Good | Good | Good | Good | 99.31 | 99.14 | 152 |
| Example 4 | Good | Good | Good | Good | 99.16 | 99.00 | 48 |
| Example 5 | Good | Good | Good | Good | 99.25 | 99.07 | 59 |
| Example 6 | Good | Good | Good | Good | 99.29 | 99.11 | 182 |
| Example 7 | Good | Good | Good | Good | 99.08 | 98.91 | 60 |
| Example 8 | Good | Good | Good | Good | 99.15 | 98.98 | 64 |
| Example 9 | Good | Good | Good | Good | 99.24 | 99.08 | 186 |
| Comparative Example 1 | Good | Good | Poor | Poor | 98.76 | 98.52 | 142 |
| Comparative Example 2 | Good | Good | Poor | Poor | 98.82 | 98.59 | 80 |
| Comparative Example 3 | Good | Good | Poor | Poor | 98.80 | 99.60 | 96 |

Referring to Table 1, the liquid crystal photo-alignment agents of Examples 1 to 9 exhibit good voltage transmission and voltage holding ratios as well as good printability and film uniformity when the photo-epoxy additive is included in an amount of 0.05 to 50 parts by weight based on the total amount of the polymer.

As also shown in Table 1, the liquid crystal photo-alignment film including the liquid crystal alignment agents of Examples 1 to 9 has superior printability, film uniformity, voltage transmission, and/or voltage holding ratio, as compared to those of Comparative Examples 1 to 3. The liquid crystal photo-alignment film including liquid crystal photo-alignment agents of Examples 1 to 9 has good electrical characteristics such as voltage transmittance, voltage holding ratio, residual DC voltage, and so on.

The voltage holding ratio and the residual DC voltage are references for determining after-image characteristics of the liquid crystal photo-alignment film, and the after-image characteristics are more improved as the voltage holding ratio is higher and the residual DC voltage is lower. Accordingly, the liquid crystal photo-alignment agents of Examples 1 to 9 have excellent after-image characteristics compared to those of Comparative Examples 1 to 3.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal photo-alignment agent comprising:
an epoxy compound comprising a compound represented by the following Chemical Formula 2, Chemical Formula 4, or a combination thereof, and
a polymer comprising a polyamic acid, a polyimide, or a mixture thereof,

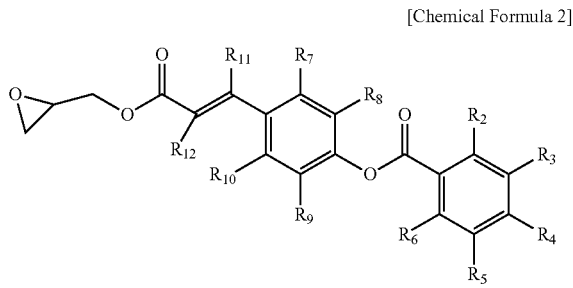

[Chemical Formula 2]

wherein, in the above Chemical Formula 2, $R_2$ to $R_6$ are independently hydrogen, substituted or unsubstituted alkyl, substituted or unsubstituted aryl, or substituted or unsubstituted heteroaryl, and $R_7$ to $R_{12}$ are independently substituents selected from the group consisting of hydrogen, C1 to C20 alkyl, C2 to C20 alkoxyalkyl, C1 to C20 haloalkyl, and an aromatic group, or substituents selected from the group consisting of C1 to C6 alkyl and an alicyclic group,

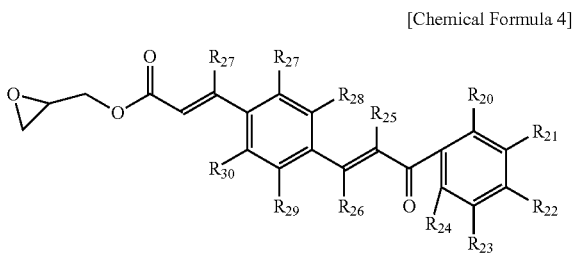

[Chemical Formula 4]

wherein, in the above Chemical Formula 4, $R_{20}$ to $R_{24}$ are independently hydrogen, substituted or unsubstituted alkyl, substituted or unsubstituted aryl, or substituted or unsubstituted heteroaryl, $R_{25}$ and $R_{26}$ are independently hydrogen, halogen, cyano, or substituted or unsubstituted C1 to C12 alkyl, wherein in $R_{25}$ and $R_{26}$, the substituted alkyl is an alkyl substituted with halogen, cyano, or a combination thereof, or is an alkyl comprising one or more non-adjacent $CH_2$ groups substituted with —O—, —CO—O—, —O—CO—, —CH=CH—, or a combination thereof, and $R_{27}$ to $R_{30}$ are independently substituents selected from the group consisting of hydrogen, C1 to C20 alkyl, C2 to C20 alkoxyalkyl, C1 to C20 haloalkyl, and an aromatic group, or substituents selected from the group consisting of C1 to C6 alkyl and an alicyclic group.

2. The liquid crystal photo-alignment agent of claim 1, comprising the epoxy compound in an amount of 0.01 to 60 parts by weight based on 100 parts by weight of the polymer.

3. The liquid crystal photo-alignment agent of claim 1, comprising the epoxy compound in an amount of 0.05 to 50 parts by weight based on 100 parts by weight of the polymer.

4. The liquid crystal photo-alignment agent of claim 1, comprising the epoxy compound in an amount of 0.05 to 30 parts by weight based on 100 parts by weight of the polymer.

5. The liquid crystal photo-alignment agent of claim 1, wherein the polyamic acid includes a repeating unit represented by the following Chemical Formula 5:

[Chemical Formula 5]

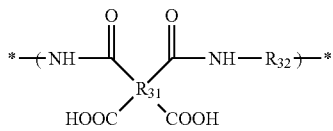

wherein, in the above Chemical Formula 5, $R_{31}$ is a quadrivalent organic group derived from an aliphatic cyclic acid dianhydride, or an aromatic acid dianhydride, and $R_{32}$ is a divalent organic group derived from a diamine.

6. The liquid crystal photo-alignment agent of claim 1, wherein the polyimide includes a repeating unit represented by the following Chemical Formula 6:

[Chemical Formula 6]

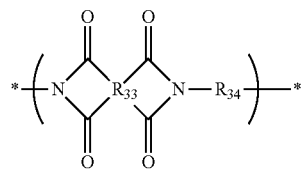

wherein, in the above Chemical Formula 6, $R_{33}$ is a quadrivalent organic group derived from an aliphatic cyclic acid dianhydride, or an aromatic acid dianhydride, and $R_{34}$ is a divalent organic group derived from a diamine, or a divalent organic group derived from a cumarin-based photo-diamine, a chalcone-based photo-diamine, or a cinnamate-based photo-diamine.

7. A liquid crystal photo-alignment film manufactured using the liquid crystal photo-alignment agent according to claim 1.

* * * * *

UNITED STATES PATENT AND TRADEMARK OFFICE
CERTIFICATE OF CORRECTION

PATENT NO. : 8,722,158 B2
APPLICATION NO. : 13/151647
DATED : May 13, 2014
INVENTOR(S) : Hyo-Ju Seo et al.

Page 1 of 1

It is certified that error appears in the above-identified patent and that said Letters Patent is hereby corrected as shown below:

In the Specification

Column 10, line 49 reads: "—COO—," and should read: "—OCO—,"

Column 12, line 10 reads: "$R_{80}$ is —O—, —COO—, —CONH—, or —COO—,"
and should read: "$R_{80}$ is —O—, —COO—, —CONH—, or —OCO—,"

Column 21, line 30 reads: "80 g of a PM-1 solution having a solid content of 8 wt%"
and should read: "80 g of a PAA-1 solution having a solid content of 8 wt%"

Signed and Sealed this
Ninth Day of September, 2014

Michelle K. Lee
*Deputy Director of the United States Patent and Trademark Office*